United States Patent [19]

Harris

[11] 3,902,061

[45] Aug. 26, 1975

[54] DIGITAL OPTICAL COMPUTER TECHNIQUES

[75] Inventor: Ellis D. Harris, Claremont, Calif.

[73] Assignee: Xerox Corporation, Stamford, Conn.

[22] Filed: Aug. 9, 1974

[21] Appl. No.: 495,939

Related U.S. Application Data

[63] Continuation of Ser. No. 396,941, Sept. 12, 1973, abandoned.

[52] U.S. Cl. .............. 250/213 A; 307/311; 307/312

[51] Int. Cl. ... H01j 31/50; H03k 3/42; H03k 19/14

[58] Field of Search ......... 307/311, 312; 250/213 A

*Primary Examiner*—James W. Lawrence

*Assistant Examiner*—T. N. Grigsby

*Attorney, Agent, or Firm*—James J. Ralabate; Terry J. Anderson; Irving Keschner

[57] ABSTRACT

An optical device for gating an incident light ray which utilizes the principle of absorption edge shift in a semiconductor due to an external electric field. The optical device comprises a semiconductor material and a source of bias potential applied thereacross. In a preferred embodiment, a PN junction is provided for control purposes such that the potential is primarily dropped across the junction. The absorption band edge of the semiconductor is selected to correspond to the wavelength of the incident radiation to be controlled whereby in the normal mode of operation, the semiconductor appears to be transparent to the incident radiation. When charged carriers are introduced at the junction, the potential is dropped across the semiconductor, causing an absorption edge shift towards longer wavelengths. In this mode of operation, the incident radiation is substantially absorbed, or attenuated, by the semiconductor.

26 Claims, 7 Drawing Figures

DIGITAL OPTICAL COMPUTER TECHNIQUES

This is a continuation of application Ser. No. 396,941 filed Sept. 12, 1973, now abandoned.

The transmissive and absorptive characteristic of the semiconductor to incident radiation hereinabove described is utilized to perform the optical logic functions of a "nor" gate and a bistable multivibrator or flip-flop.

BACKGROUND OF THE INVENTION

As computer systems and applications evolve to the point where extremely large storage capacities are required, optical techniques have been extensively investigated as means for storing information with information packing densities greater than those possible with magnetic recording. Optical techniques require a memory area which is substantially smaller than the area required by a magnetic memory. The potential savings in memory size and complexity are obvious.

A general purpose digital computer using optical memory, as described hereinabove, and optical techniques for switching and logic functions in combination provide an ideal computer system which relies solely on optical methods for real-time data processing.

A system for optically performing the digital logic is shown in U.S. Pat. No. 3,431,437. As disclosed therein, signals are represented by the presence or absence of light. The system utilizes a semiconductor laser diode having a unitary elongated planar junction which is adapted for light signal amplification in a first direction and adapted for laser oscillation in a second transverse direction. Laser oscillations occur normally to provide an output light signal from the junction region. An input light signal, however, directed to the junction region in the first direction is amplified in the junction region to a value which quenches the laser oscillation and cuts off the normal output light signal.

An obvious disadvantage of the device heretofore described is that a semiconductor laser diode must be utilized with its attendant cost of construction. For example, the light signal input edge must first be made optically smooth by cleaning or lapping and then applying a light transmitting coating to the edge. The parallel reflecting surfaces must be spaced apart by an accurately determined amount so that coherent light oscillations at a frequency peculiar to the semiconductor material are established in the laser oscillator cavity. Additionally, in order for the device to operate in a mode wherein the normally occurring laser oscillations can be quenched, the input, or switching, light signal must have a frequency determined by the semiconductor material. If the frequency of the switching light signal varies from the predetermined frequency, optical switching will not occur.

A further disadvantage of the device set forth in the aforementioned patent is that an array of the optical elements disclosed does not lend itself to coherent processing of an input beam since each element will be its own light generator, the phase of each output light beam being random with respect to one another.

SUMMARY OF THE PRESENT INVENTION

The present invention provides apparatus for performing digital logic functions optically and which utilizes absorption edge shift in a semiconductor to achieve an optical gate.

An electric field is required to shift the absorption band edge and in a preferred embodiment, is controlled by means of carriers introduced at a back-biased junction of the semiconductor. A d-c voltage, or potential, from an external source is divided between the PN junction and the bulk semiconductor. In the absence of charge carriers, the voltage is primarily dropped across the junction. When the carriers are introduced directly by an electron or optical beam, the PN junction becomes conducting and the external voltage is dropped across the bulk semiconductor producing an absorption edge shift toward longer wavelengths.

In a first embodiment, the presence of a control beam blocks passage of an input, or reference beam, while absence of the control beam allows the reference beam to pass through the semiconductor.

In a second embodiment, a reflecting member is formed on one surface of the semiconductor, and the incident radiation, in the absence of the control beam, is reflected out through the other surface of the semiconductor.

The optical gate described hereinabove is utilized to provide the logical "nor" and flip-flop, or bistable multivibrator, logical negation process. These logic functions can be utilized to provide all the required computing functions required in an optical digital computer.

It is an object of the present invention to provide an improved device for performing digital logic functions optically.

It is a further object of the present invention to provide an improved optical gating device which utilizes the principle of electric field induced absorption edge shift in a semiconductor.

It is still a further object of the present invention to provide a device which performs digital logic optically, the device providing the logical "nor" and bistable functions.

It is an object of the present invention to provide an array of optical gating elements for coherent processing of optical information, each gating element utilizing the principle of electric field induced absorption edge shift in a semiconductor, each element in the array generating a light output in phase with a reference beam incident thereon and in phase with the light output from every other optical element in the array.

DESCRIPTION OF THE DRAWINGS

For a better understanding of the invention, as well as other objects and further features thereof, reference is made to the following description which is to be read in conjunction with the following drawings wherein.

DESCRIPTION OF THE PREFERRED EMBODIMENT

Figure 1:
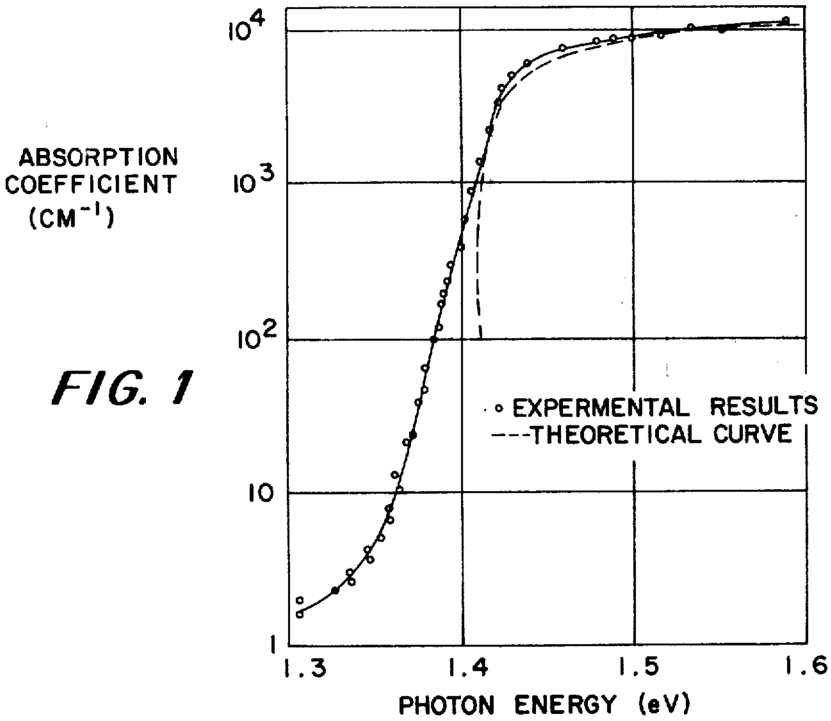
FIG. 1 is the absorption spectra for gallium arsenide.

Optical absorption in a semiconductor is dominated by the band-gap energy. The band-gap energy may be defined as the amount of energy required to raise an electron in a crystal from the highest filled level (band) to the next empty available energy level. Radiation having quantum energy (quantum energy being inversely proportional to the wavelength of the radiation) less than the band-gap experiences little or no attenuation through the semiconductor, while radiation having energy above the band-gap is drastically attenuated. It has been determined that near the band-gap energy the absorption is characterized by a steep edge or transition. For example T. S. Moss, in an article in the Journal of Applied Physics (*Optical Absorption Edge in GaAs and Its Edpendence on Electric Field*, Journal of Applied Physics, Supplemental to Volume 32, No. 10, Page 2,136, 1961), discusses the effect of an electrical field on the optical absorption edge in gallium arsenide. FIG. 1 is a plot of the measured and theoretical absorption curves for gallium arsenide as determined by Moss and shows that the absorption coefficient of gallium arsenide is exponential from a value of 6.3 $cm^{-1}$ at a photon energy equal to 1.355 ev ($\lambda = 0.915\mu$) to a value of 4,000 $cm^{-1}$ at photon energy equal to 1.425 ev ($\lambda = 0.870\mu$).

Figure 2:
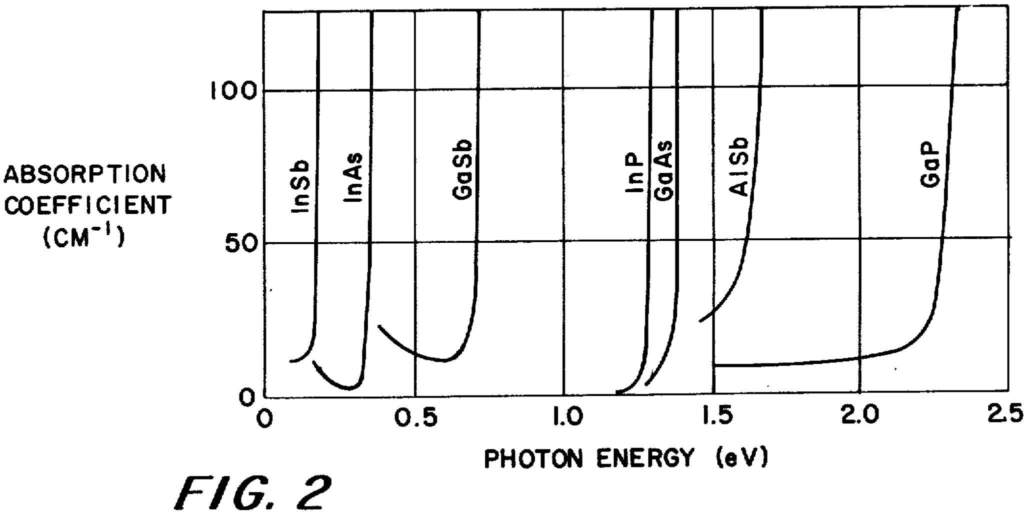
FIG. 2 is the absorption spectra of III–V compounds.

FIG. 2 is a plot illustrating the similarity of the transition edge of the absorption spectra for Group III–V compounds.

Both gallium arsenide and cadmium sulphide have been shown to exhibit a variation of the absorption edge energy under the influence of an electrical field. The aforementioned Moss reference and an article by R. Willians, *Electrical Field Induced Light Absorption in CdS*, Physical Review, Volume 117, Page 1,487, 1960, describe the shift in gallium arsenide and cadmium sulphide, respectively. For example, an electric field of 50 kv/cm produces a shift, toward lower energy, of some 0.021 ev for gallium arsenide. A field of 12 kv/cm produces a shift, toward lower energy, of approximately 0.03 ev in cadmium sulphide.

Although the shift has been observed in the two semiconductors mentioned hereinabove, similar results are expected for all direct band gap semiconductors (the Group III–V intermetallic semiconductors), i.e., a steep absorption edge (FIG. 2) and a shifting of this edge toward lower energy under the influence of an electric field.

To exemplify the aforementioned absorption edge shift and the corresponding effect on logic attenuation, assume that a helium-neon laser generating an output wavelength of $0.5328\mu$ is utilized as a source of reference radiation and an intermetallic alloy (semiconductor) having an absorption edge corresponding to the laser wavelength, i.e., $0.6328\mu$, is provided. From the spectra of FIG. 2 it is readily seen that a semiconductor compound having the desired characteristic can easily be fabricated. A gallium-arsenide-phosphide compound ($Ga(As_x \cdot P_{1-x})$) will cover the spectral range of approximately $0.54\mu$ to $1.38\mu$ when $x$ is between one and zero. It should be further noted that a specific semiconductor can be initially selected, and that the laser (a dye laser for example) can be tuned to the corresponding wavelength. The shift voltage required and optical attenuations can be calculated for the laser wavelength as follows:

$$\frac{I}{I_o} = e^{-2l\alpha} = 10^{-.868l\alpha} \qquad (1)$$

wherein, $I$ = intensity of radiation after reflection within semiconductor
$l$ = thickness of semiconductor
$\alpha$ = attenuation coefficient
$I_o$ = incident radiation intensity
$\alpha = 6.3 \times 10^{-1}\ cm^{-1}$ open (substantially (2) full optical transmission)
$\alpha = 4 \times 10^{3}\ cm^{-1}$ closed (substantially (3) no optical transmission)

Assuming that the edge shift for the semiconductor fabricated to correspond to the $0.6328\mu$ laser frequency is substantially similar to the shift required for gallium arsenide, a field of 5 kv/mm is needed to produce an absorption edge shift of 0.021 ev. The quantum energy difference for full transmission to no transmission amounts to approximately 0.07 ev and hence an electric field of 9.4 kv/mm is required to produce the 0.070 ev shift from full "open" to full "closed". The voltage required to shift the absorption edge is therefore given by:

$V = 9.4$ kv/mm $\times$ $l$ (mm)

This formula is applicable to the Group III-V compounds.

The following table presents the voltage required and transmissions achieved as a function of semiconductor thickness.

OPEN AND CLOSED TRANSMISSIONS AND SWITCHING VOLTAGE AND FUNCTION OF SEMICONDUCTOR THICKNESS

| THICKNESS | SWITCHING VOLTAGE V | TRANSMISSION OPEN $I/I_o$ | TRANSMISSION CLOSED $I/I_o$ |
|---|---|---|---|
| $6\mu$ | 55.5 volt | $10^{-.0033}$ | $10^{-2.08}$ |
| $8\mu$ | 75.1 volt | $10^{-.0044}$ | $10^{-2.77}$ |
| $10\mu$ | 94 volt | $10^{-.0055}$ | $10^{-3.17}$ |

The principle described hereinabove is applicable to both continuous and intermittent (switching) modes of operation. However, the resistivity of the presently known semiconductor materials makes continuous operation unattractive. The power (P) consumed in the bulk material is calculated as:

$$P = \frac{V^2}{R} = \frac{(El)^2}{\rho\, l/A} = \frac{E^2 l^2 A}{\rho} \qquad (5)$$

wherein $E$ = electric field strength
$l$ = thickness of the semiconductor
$\rho$ = resistivity of the semiconductor
$A$ = cross-sectional areas of the semiconductor At $E = 9.4\ V/\mu$, $l = 6\mu$, $A = 36\mu^2$ and $\rho = 10^8$ ohm-cm, the power to shift the band edge of 0.070ev is approximately 1.0 watts. Power consumption can be minimized by: (1) reducing the field strength and accepting a reduced "open" to "closed" ratio; (2) reducing the volume of material; or (3) increasing the bulk resistivity. In practice, adjustment of bulk resistivity is the parameter utilized to control power consumption in the semiconductor. For continuous operation, however, the bulk resistivity must be increased significantly. For this reason, the preferred mode of operation is to utilize the absorption shift principle for low duty cycle, or transient switching, where the energy required is of the order of microjoules per bit or less for switching times less than 1 μsec.

Figure 3:
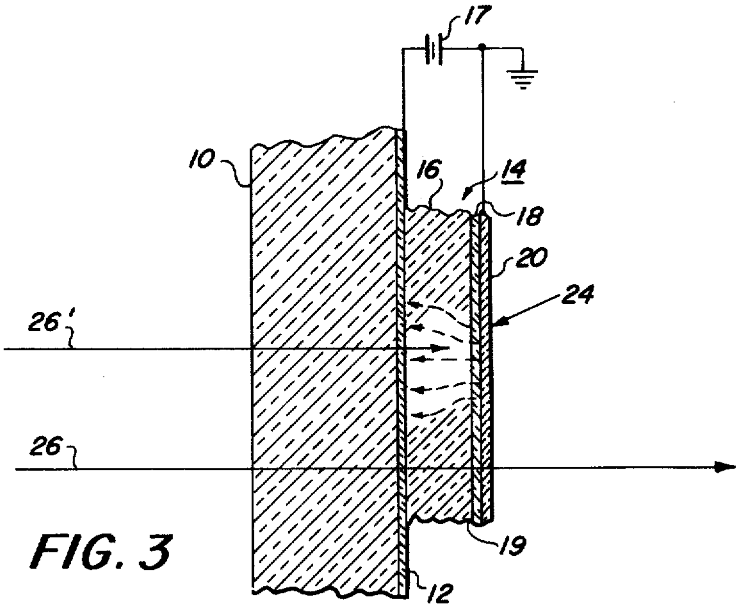
FIG. 3 shows one embodiment of the optical gate of the present invention.

Referring to FIG. 3, an optical gate incorporating the concepts and principles described hereinabove is shown. The optical gate comprises a transparent substrate 10 having a conductive electrode 12 formed thereon. A semiconductor material 14, such as gallium arsenide, overlies and is in contact with conductive electrode 12 and comprises a layer of P-type material 16, and a layer 18 of N-type semiconductor material. Conductive electrode layer 20 overlies layer 18. The terms N-type and P-type are used to denote materials having an excess of free electrons and an excess of holes (deficiency of free electrons), respectively. A source of d-c potential 17 is applied between electrodes 12 and 20 as shown.

The optical gate operates as follows: A source of radiation (not shown) generates a radiation beam 26 which is incident upon transparent substrate 10. As will be discussed more fully with reference to FIGS. 5 and 6 hereinafter, the absence or presence of the radiation beam on the side of the optical gate opposite to the side on which the radiation beam is incident represents digital logic "0" and "1" information signals, respectively. The d-c voltage from the source 17 is divided between the PN junction 19 and the P-type layer 16. The electrical field required to shift the absorption band edge is controlled by means of charge carriers introduced at the back bias PN junction 19. In the absence of charge carriers, the voltage is primarily dropped across junction 19. However, when carriers are introduced, junction 19 becomes conducting, and the voltage is dropped substantially across the P-type semiconductor 16, producing an absorption edge shift toward longer wavelengths. In the embodiment shown in FIG. 3, an electron beam 24 is utilized to generate the charge carriers (an optical beam may also be utilized). The electron beam 24 is absorbed by N type layer 18 after passing through electrode 20. The absorbed electrons, release additional electrons according to their kinetic energy. The presence of the charge carriers causes the applied voltage to appear across the P-type layer 16, causing a shift in the absorption band as described hereinabove.

In the absence of the electron beam 24, radiation beam 26 is transmitted through substrate 10, electrode 12, semiconductor 14 and electrode 20. It should be noted that the wavelength of ray 26 is such that it corresponds to that portion of the absorption curve for the semiconductor material 16 selected wherein the semiconductor 16 is substantially transmissive to (open) the beam 26. When electron beam 24 is applied to the optical gate, charge carriers are generated and the absorption edge characteristic of semiconductor 16 is shifted toward longer wavelengths (lower energy levels). The voltage applied across the semiconductor 16, the thickness thereof, the semiconductor material and the wavelength of the incident radiation beam 26 are selected in a manner described previously such that the edge shift is sufficient such that the incident beam (illustrated as 26') is substantially absorbed by the semiconductor material 14.

It should be noted that the gallium arsenide material 14 was doped to provide a P-N junction for control purposes. Intrinsic (undoped) gallium arsenide may also be utilized with an alternate control scheme if desired.

Figure 4:
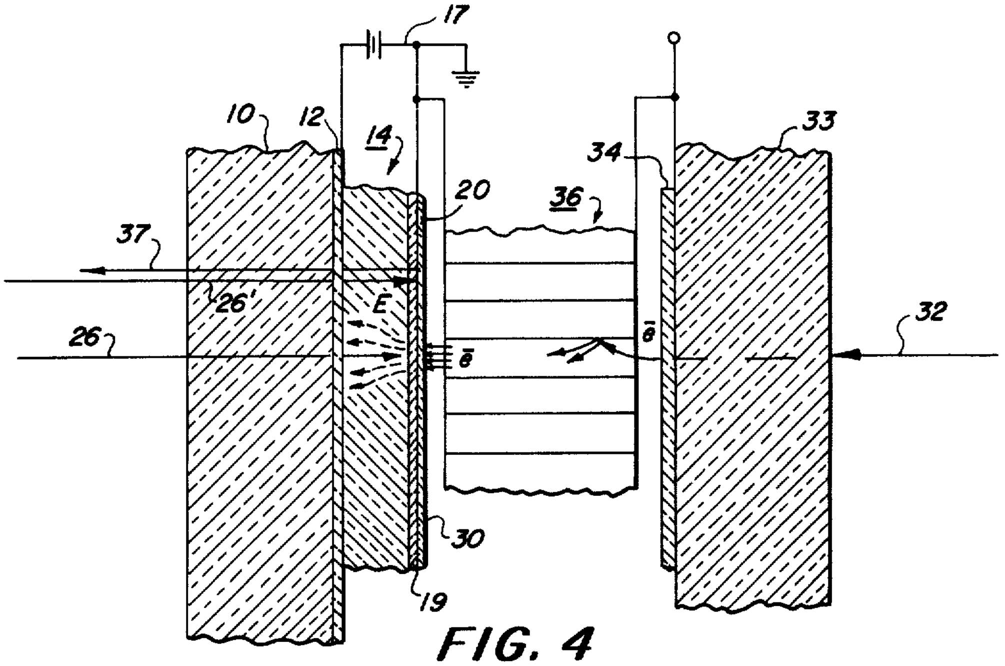
FIG. 4 shows a second embodiment of the optical gate formed in accordance with the teachings of the present invention.

The optical gate shown in FIG. 4 is similar to the gate shown in FIG. 3. In this embodiment, a dielectric mirror 30 is formed on the transparent electrode 20 (the reference numerals of FIG. 3 are utilized in FIG. 4 to identify identical elements). The charge carriers are provided by a focussed optical beam 32 which is incident upon photocathode layer 34 via substrate 33. The electrons emitted from photocathode layer 34 may be multiplied by electron multiplier 36 to provide power gain, or, alternatively, impinge directly on the optical gate. As described with reference to FIG. 3, with beam 32 being applied to the optical gate, the incident reference beam 26 is absorbed in the semiconductor material 16. With the absence of beam 32, the incident, or reference, beam 26' is transmitted through semiconductor 14 and reflected by dielectric mirror 30, the reflected beam 37 exiting the optical gate parallel to, but in an opposite sense, to incident beam 26'.

Figure 5:
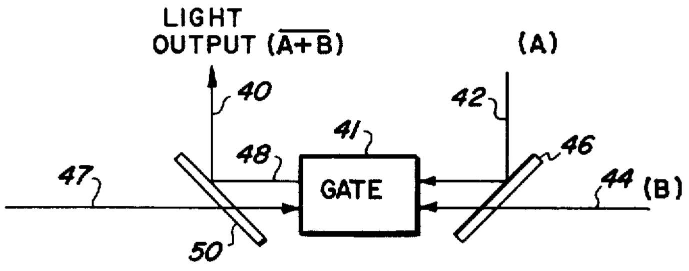
FIG. 5 shows the gate of FIG. 4 arranged in an optical "nor" configuration.

The optical gate described in FIGS. 3 and 4 may be configured to perform the logical "nor" function as shown in FIG. 5. For illustrative purposes, the optical gate shown in FIG. 4 is utilized as the optical gate 41 ("nor" arrangement). A light output beam 40, corresponding to the logical "nor" function $\overline{A+B}$, is normally provided when light beams 42, corresponding to a digital input A, and 44, corresponding to the digital input signal B, are simultaneously not present. Therefore, a light beam is not applied to the optical gate 41 via beam splitter 46. In this case, the input, or reference, beam 47 is applied via beam splitter 48 to optical gate 41 and reflected from the gate in the manner described with reference to FIG. 4 as beam 48, and then reflected by beam splitter 50, the latter reflected beam corresponding to output beam 40.

If either one of the beams 42 or 44 are present, reference beam 47 is absorbed by optical gate 41 and beam 40 is not present.

Obviously, the "pass-through" technique of FIG. 3 can be utilized as the optical "nor" gate, the output beam 40 appearing at a location different than that shown in FIG. 5.

Figure 6:
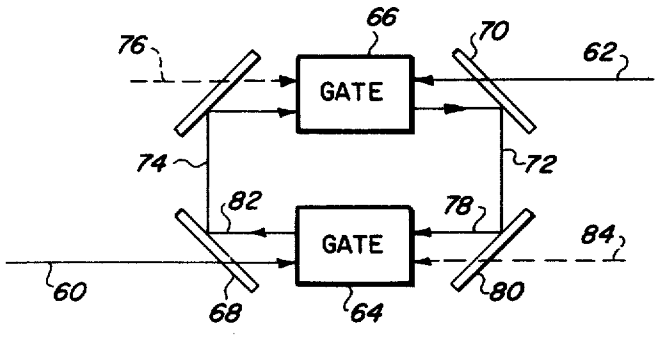
FIG. 6 shows a pair of gates arranged as an optical bistable element.

Referring now to FIG. 6, a pair of optical gates are constructed and arranged such that each drives the other, each being in one of two stable states, one gate being "full-on" (logical "1") and the other "full-off" (logical "0"). This arrangement constitutes a multivibrator or flip-flop.

In particular, assuming the optical gate of FIG. 4 is utilized, reference light beams 60 and 62 are applied to gates 64 and 66, respectively, via beam splitters 68 and 70, respectively. Initially, the multivibrator is assumed to be in the "reset" state, i.e., a beam, or logical "1" is present at the reset output 72 whereas no beam, or logical "0" appears at the set output 74. If a "set" input beam 76 is applied to the bistable element, beam 62 is absorbed by gate 66, and no beam is reflected therefrom. The beam appearing at reset output 72 is removed (extinguished), i.e. the logical "1" switches to a logical "0". The input beam 78 to gate 64 (beam 72 reflected by beam splitter 80) is similarly extinguished.

The input reference beam 60 is now reflected from gate 64 as beam 82 (beam splitter 68 reflecting this beam to set output 74). In other words, the set output 74 switches from a no beam (logical "0") state to a beam (logical "1" ) state, the bistable element therefore switching states in a flip-flop (multivibrator) operation. The bistable gate remains in the switched state even if the set reference beam is removed. If it is desired to switch back to the original state of the bistable element, a reset light input signal 84 is applied to the bistable element. This causes reference beam 60 to be absorbed by gate 64, no reference beam appearing at set output 74 (logical "0") and at the input to gate 66. Reference beam 62 is therefore reflected from gate 66 and appears at reset output 72 as a logical "1".

For general purpose computer applications, arrays of optical gates may be fabricated on semiconductor wafers with inter-element spacing in of the order of $10\mu$ or 100 elements/mm. Intensity quantization is provided by utilization of gates in bistable pairs. At 100 elements per mm a semiconductor wafer with an active diameter of 57mm will provide $25 \times 10^6$ optical gates. A pair of such wafers optically coupled is shown in FIG. 7 and will provide 25 million bistable elements each of which can be triggered to change states, the outputs of which are all in parallel, i.e., a two-dimensional optical field or image, in a condition suitable for further optical processing.

Figure 7:
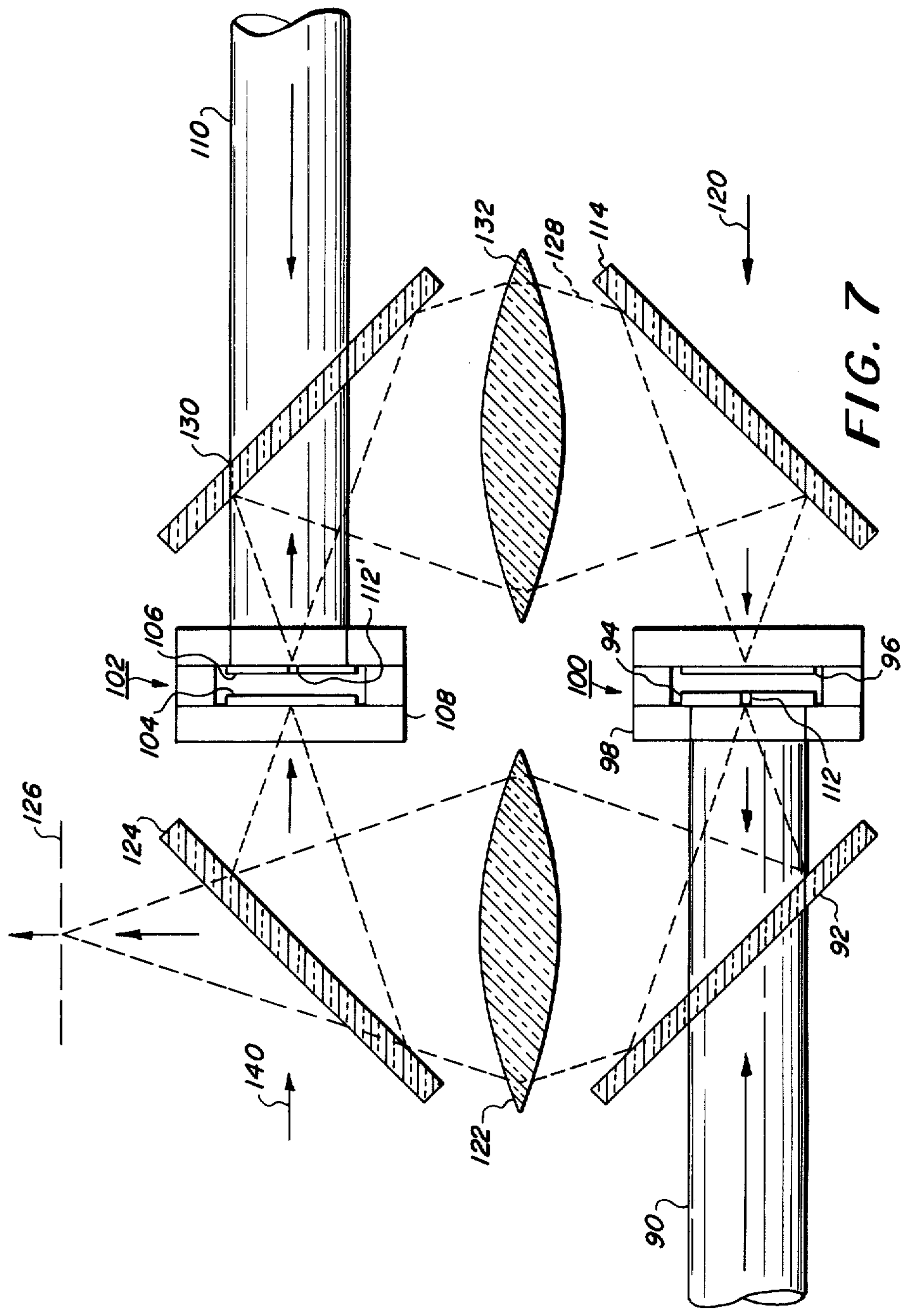
FIG. 7 shows an array of optical gate elements connected as a bistable array.

Referring more particularly to FIG. 7, a laser reference beam 90 is transmitted through beam splitter 92 onto semiconductor array 94. Semiconductor 94, photocathode 96 and the various surrounding supporting structure 98 forms gate array 100. Gate array 102, forming the bistable array with gate array 100, comprises photocathode 104, semiconductor 106 and supporting structure 108. Laser reference beams 90 and 110 are incident on semiconductors 94 and 106, respectively.

The system shown in FIG. 7 operates in a manner similar to that described with reference to FIG. 6 except in the former selected optical elements of an output image plane 126 are capable of being switched between logical "1" and logical "0" states. For example, assume that a gate element 112, one of the plurality of gates in the array, initially reflects laser beam 90 via beam splitter 92, lens 122 and beam splitter 124 onto output image plane 126. The bistable array is arranged so that gate 112 is optically aligned with gate element 112' in array 102. Gate element 112 and 112' are logically related, i.e., if gate element 112 is reflecting, gate 112' will absorb incident radiation.

If it is desired to process the signal appearing at output image plane 126 in accordance with a predetermined input beam 120, the array is operated in a manner identical to the operation of the bistable element of FIG. 6. Initially, it is assumed that a light beam 128 is present (equivalent to a logical "0" ) which is reflected by splitter 114 to gate element 112 via photocathode 96. Gate element 112 therefore absorbs the portion of laser beam 90 incident thereon and the corresponding portion, or elemental area of image plane 126, has no light appearing thereat, corresponding to a logical "0". At the same time, splitter 124 does not reflect a light beam onto photocathode 104, gate element 112' thereby reflecting that portion of laser light incident thereupon to splitter 114 via splitter 130 and lens 132, which light becomes beam 128.

Input signal 140, which may be generated in response to a computer output, may require that the area of image plane 126 corresponding to element 112 be switched to a logical "1" condition. Application of signal 140 causes the bistable elemental array (112, 112') to reverse their transmissive and reflective states in a manner described hereabove, the corresponding area of the image plane 126 being switched from a dark to a light (or logical ") 1") area.

In a similar manner, each of the bistable coupled elemental arrays can be switched incrementally or in parallel in accordance with an externally generated optical input.

In order to switch a bistable elemental array back to the original state, an appropriate optical input 120 is applied thereto.

While the invention has been described with reference to its preferred embodiment, it will be understood by those skilled in the art that various changes may be made and equivalents may be substituted for elements thereof without departing from the true spirit and scope of the invention.

What is claimed is:

1. An optical gate comprising:

semiconductor materials having predetermined bandgap energies and corresponding absorption band edge energy levels, said semiconductor materials comprising first and second type materials, means for applying a potential across said semiconductor materials, said potential initially causing said junction between the first and second type semiconductor materials to be non-conductive, means for introducing charge carriers to said junction, said charge carriers causing said junction to be conductive and causing said potential to appear substantially across said first type material, and means for irradiating said first type semiconductor material with radiation having a wavelength approximating the absorption band edge energy level of said first type material, said radiation being absorbed by said first type semiconductor material when said source of charge carriers is introduced to said junction.

2. The optical gate as defined in claim 1 wherein said radiation is transmitted through said semiconductor material when said charge carriers are not introduced to said junction.

3. The optical gate as defined in claim 1 wherein said semiconductor material includes a reflecting layer on the opposite side of said junction whereby the absence of said source of charge carriers causes the incident radiation to be reflected in a direction towards the incident radiation.

4. A "nor" logic element for light signals comprising:

a semiconductor material having a predetermined bandgap energy and a corresponding absorption band edge energy level, means for applying a potential across said semiconductor material, means for applying a source of reference radiation to said semiconductor having a wavelength approximating the absorption band edge energy level of said semiconductor, and means for applying a plurality of light inputs to said semiconductor material on the side thereof opposite said incident reference radiation, the simultaneous absence of all the light inputs causing the incident reference radiation to be reflected from the semiconductor.

5. An optical bistable multivibrator for light signals comprising:

two light signal optical gates each comprising a semiconductor material having a source of potential applied thereacross, said semiconductor materials have a predetermined bandgap energy and a corresponding absorption band edge energy level which can be shifted by a source of charge carriers applied to said semiconductor material, the light output from each optical gate being optically coupled to an input of the other optical gate, means for applying a "set" input light signal to the semiconductor material comprising one optical gate, and means for applying a "reset" input light signal to the semiconductor material comprising the other optical gate, said "set" or "reset" input light signal introducing charge carriers to the corresponding optical gate, the arrangement of the two optical gates being such that when a light signal is applied to the "set" terminal of an optical gate, a light output is present at the "set" output of said gate, and when said reset signal is applied to the reset terminal of the other optical gate, said light output is extinguished.

6. An optical gate comprising:

a semiconductor material having a predetermined bandgap energy and a corresponding absorption band edge energy level, means for irradiating said semiconductor with radiation having a wavelength approximating the absorption band edge energy level of said semiconductor material whereby said radiation is transmitted through said semiconductor material, and means for applying a potential across said semiconductor material of a magnitude sufficient to shift said absorption band edge energy level whereby said radiation is substantially absorbed in said semiconductor material.

7. The optical gate as defined in claim 1 wherein said irradiating means comprises a laser beam.

8. The optical gate as defined in claim 1 wherein said means for introducing charge carriers comprises an optical beam.

9. The optical gate as defined in claim 1 wherein said means for introducing charge carriers comprises an electron beam.

10. The logic element as defined in claim 4 wherein the presence or absence of radiation in a direction opposite to the incident reference radiation is characterized as a logic 0 or logic 1, respectively.

11. The logic element as defined in claim 4 wherein said source of reference radiation comprises a laser beam.

12. The optical gate as defined in claim 6 wherein said irradiating means comprises a laser beam.

13. An array of optical bistable multivibrators for processing light signals, each optical bistable multivibrator comprising:

two light signal optical gates each comprising a semiconductor material having a source of potential applied thereacross, said semiconductor materials have a predetermined bandgap energy and a corresponding absorption band edge energy level which can be shifted by a source of charge carriers applied to said semiconductor material, the light output from each optical gate being optically coupled to an input of the other optical gate, means for applying a "set" input light signal to the semiconductor material comprising one optical gate, said "set" or "reset" light input signal introducing charge carriers to the corresponding semiconductor material, means for applying a "reset" input light signal to the semiconductor material comprising the other optical gate, the arrangement of the two optical gates being such that when an optical signal is applied to the "set" terminal of an optical gate, a light output is present at the "set" output of said gate, and when said reset signal is applied to the reset terminal of the other optical gate, said light output is extinguished, a plurality of said optical bistable multivibrators formed on a first semiconductor wafer, a plurality of said optical bistable multivibrators formed on a second semiconductor wafer, said first and second semiconductor wafers being optically coupled, and means for applying an optical signal to said array, said optical signal appearing, in modified form, at an output plane by the selective application of said "set" or "reset" input light signals.

14. The array as set forth in claim 13 wherein said "set" and "reset" input light signals comprise laser beams.

15. Apparatus for controlling the absorption characteristics of a semiconductor material, said semiconductor material comprising a layer of P-type material overlying a layer of N-type material, a junction being formed therebetween, said semiconductor material having predetermined bandgap energies and corresponding absorption band edge energy levels, whereby the amount of incident radiation transmitted through said semiconductor is controlled comprising:

means for applying a potential across said P-type and N-type material, said potential initially causing said junction to be non-conductive, means for introducing charge carriers to said junction, said charge carriers causing said junction to be conductive and causing said potential to appear substantially across said P-type material, and means for irradiating said P-type material with radiation having a wavelength approximating the absorption band edge energy level of said P-type material, said radiation being absorbed by said P-type material when said source of charge carriers is introduced to said junction.

16. The apparatus as defined in claim 15 wherein said radiation is transmitted through said semiconductor material when said charge carriers are not introduced to said junction.

17. The apparatus as defined in claim 15 wherein said irradiating means comprises a laser.

18. The apparatus as defined in claim 15 wherein said means for introducing charge carriers comprises an optical beam.

19. The apparatus as defined in claim 15 wherein said means for introducing charge carriers comprises an electron beam.

20. Apparatus for controlling the absorption characteristics of a semiconductor material, said semiconductor material comprising a layer of P-type material overlying a layer of N-type material, a junction being formed therebetween, said semiconductor material having predetermined bandgap energies and corresponding absorption band edge energy levels, whereby the amount of incident radiation transmitted through said semiconductor is controlled comprising:

means for applying a potential across said P-type and N-type material, said potential initially causing said junction to be non-conductive, means for introducing charge carriers to said junction, said charge carriers causing said junction to be conductive and causing said potential to appear substantially across said N-type material, and means for irradiating said N-type material with radiation having a wavelength approximating the absorption band edge energy level of said N-type material, said radiation being absorbed by said N-type material when said source of charge carriers is introduced to said junction.

21. The apparatus as defined in claim 20 wherein said radiation is transmitted through said semiconductor material when said charge carriers are not introduced to said junction.

22. The apparatus as defined in claim 20 wherein said irradiating means comprises a laser.

23. The apparatus as defined in claim 20 wherein said means for introducing charge carriers comprises an optical beam.

24. The apparatus as defined in claim 20 wherein said means for introducing charge carriers comprises an electron beam.

25. Apparatus for controlling the absorption characteristics of a semiconductor material, said semiconductor material having a predetermined bandgap energy and a corresponding absorption band edge energy level, whereby the amount of incident radiation transmitted through said semiconductor material is controlled comprising:

means for irradiating said semiconductor with radiation having a wavelength approximating the absorption band edge energy level of said semiconductor material whereby said radiation is transmitted through said semiconductor material, and means for applying a potential across said semiconductor material of a magnitude sufficient to shift said absorption band edge energy level whereby said radiation is substantially absorbed in said semiconductor material.

26. The apparatus as defined in claim 25 wherein said irradiating means comprises a laser beam.

* * * * *